(12) United States Patent
Dalstra

(10) Patent No.: US 11,306,016 B2
(45) Date of Patent: Apr. 19, 2022

(54) METHOD OF PRODUCING GLASS PRODUCTS FROM GLASS PRODUCT MATERIAL AND AN ASSEMBLY FOR PERFORMING SAID METHOD

(71) Applicant: CENTRUM VOOR TECHNISCHE INFORMATICA B.V., Groningen (NL)

(72) Inventor: Joop Dalstra, Groningen (NL)

(73) Assignee: Centrum Voor Techishe Informatica B.V., Groningen (NL)

( * ) Notice: Subject to any disclaimer, the term of this patent is extended or adjusted under 35 U.S.C. 154(b) by 166 days.

(21) Appl. No.: 14/106,596

(22) Filed: Dec. 13, 2013

(65) Prior Publication Data

US 2014/0174127 A1 Jun. 26, 2014

(30) Foreign Application Priority Data

Dec. 13, 2012 (NL) ...................................... 2009980

(51) Int. Cl.
   *G01N 21/90* (2006.01)
   *G01N 21/88* (2006.01)
   (Continued)

(52) U.S. Cl.
   CPC .............. *C03B 9/41* (2013.01); *B07C 5/3408* (2013.01); *B07C 5/3422* (2013.01); *G01N 21/90* (2013.01);
   (Continued)

(58) Field of Classification Search
   CPC ........... G01N 21/9018; G01N 21/9036; G01N 2021/9063; G01N 2021/8858;
   (Continued)

(56) References Cited

U.S. PATENT DOCUMENTS 4,025,202 A * 5/1977 Deane ................ G01N 21/9045
356/239.4
4,332,606 A * 6/1982 Gardner ................ B07C 5/3412
65/158
(Continued)

FOREIGN PATENT DOCUMENTS

EP        2333502 A2    6/2011
JP       2002319565    10/2002
(Continued)

OTHER PUBLICATIONS

Dutch International Search Report, dated Dec. 13, 2012.

*Primary Examiner* — Jodi C Franklin
(74) *Attorney, Agent, or Firm* — Patterson Intellectual Property Law, P.C.

(57) ABSTRACT

The invention is related to a method of producing glass products from glass product material. Said method comprises the steps of heating the glass product material, shaping the heated glass product material into a glass product, cooling the shaped glass product, and inspecting the shaped glass products by means of at least one sensor sensitive to infrared radiation In said inspecting step a first image of the glass product is taken under a first viewing angle. In addition a second image of said glass product is taken under a second viewing angle which is different from the first viewing angle. The first image is compared with the second image for eliminating parasite reflections. The first and second images are analyzed for detecting whether said glass product is defective or not. An assembly is described for performing said method of producing glass products from glass product material.

29 Claims, 7 Drawing Sheets

(51) Int. Cl.
  *C03B 9/41*  (2006.01)
  *G01N 25/72* (2006.01)
  *B07C 5/34*  (2006.01)
  *B07C 5/342* (2006.01)

(52) U.S. Cl.
  CPC ..... *G01N 25/72* (2013.01); *G01N 2021/9063* (2013.01)

(58) Field of Classification Search
  CPC ..... G01N 2021/8867; G01N 2021/887; G01N 2021/888; B07C 5/3412; B07C 5/342
  See application file for complete search history.

(56) References Cited

U.S. PATENT DOCUMENTS

| | | | | |
|---|---|---|---|---|
| 4,421,542 A | * | 12/1983 | Poad | B07C 5/122 209/3.2 |
| 4,639,263 A | * | 1/1987 | Kulikauskas | B07C 5/126 65/158 |
| 4,701,612 A | * | 10/1987 | Sturgill | G01N 21/9054 250/223 B |
| 4,915,237 A | * | 4/1990 | Chang | B07C 5/122 198/406 |
| 4,958,223 A | * | 9/1990 | Juvinall | G01N 21/9054 348/127 |
| 5,200,801 A | * | 4/1993 | Juvinall | G01N 21/9054 250/223 B |
| 5,279,636 A | * | 1/1994 | Waters | B07C 5/122 209/577 |
| 5,437,702 A | * | 8/1995 | Burns | B07C 5/3408 209/525 |
| 5,926,268 A | * | 7/1999 | Bonewitz | G01N 21/21 356/240.1 |
| 5,926,556 A | * | 7/1999 | Douglas | G06K 7/10722 382/142 |
| 5,969,810 A | * | 10/1999 | Nicks | G01N 21/9036 356/239.4 |
| 5,987,159 A | * | 11/1999 | Nichani | G01N 21/88 382/141 |
| 6,025,910 A | * | 2/2000 | Lucas | B07C 5/126 356/240.1 |
| 6,047,082 A | * | 4/2000 | Rhody | G01M 11/0207 382/141 |
| 6,049,379 A | * | 4/2000 | Lucas | G01N 21/9036 250/223 B |
| 6,067,155 A | * | 5/2000 | Ringlien | G01N 21/21 356/240.1 |
| 6,087,673 A | * | 7/2000 | Shishido | G01N 21/95607 250/208.1 |
| 6,089,108 A | * | 7/2000 | Lucas | B07C 5/3408 250/223 B |
| 6,104,482 A | * | 8/2000 | Brower | G01N 21/9054 356/239.4 |
| 6,118,526 A | * | 9/2000 | Hidalgo | G01N 21/59 356/239.1 |
| 6,175,107 B1 | * | 1/2001 | Juvinall | G01N 21/9054 250/223 B |
| 6,272,248 B1 | * | 8/2001 | Saitoh | G06K 9/46 382/218 |
| 6,427,737 B1 | * | 8/2002 | Katayama | B60C 11/11 152/209.21 |
| 6,448,549 B1 | * | 9/2002 | Safaee-Rad | G01N 21/9054 250/223 B |
| 6,549,292 B1 | * | 4/2003 | Schmidt | G01B 11/06 356/630 |
| 6,584,805 B1 | * | 7/2003 | Burns | C03B 9/41 209/524 |
| 6,618,495 B1 | * | 9/2003 | Furnas | G01N 21/90 209/526 |
| 6,701,001 B1 | * | 3/2004 | Kenneway | B07C 5/3422 382/141 |
| 6,863,860 B1 | * | 3/2005 | Birckbichler | B29C 49/78 250/341.8 |
| 7,248,348 B2 | * | 7/2007 | Chin | G01M 11/0285 348/127 |
| 7,329,855 B2 | * | 2/2008 | Katayama | G01N 21/9054 250/223 B |
| 7,334,619 B2 | * | 2/2008 | Kishida | B60C 11/0306 152/209.21 |
| 7,359,093 B2 | * | 4/2008 | Schweid | H04N 1/00092 358/3.26 |
| 7,416,004 B2 | * | 8/2008 | Koya | B60C 11/11 152/209.17 |
| 7,487,810 B2 | * | 2/2009 | Kishida | B60C 11/1218 152/209.21 |
| 7,607,545 B2 | * | 10/2009 | Daniel | B07C 5/122 209/523 |
| 7,816,639 B2 | * | 10/2010 | Diehr | G01N 21/9054 250/223 B |
| 7,821,629 B2 | * | 10/2010 | Akkerman | G01N 21/9018 356/239.4 |
| 7,924,421 B2 | * | 4/2011 | Schmidt | G01B 11/245 356/239.4 |
| 8,002,005 B2 | * | 8/2011 | Sakamaki | B60C 11/1218 152/209.22 |
| 8,077,307 B2 | * | 12/2011 | Pertzov | G01N 21/8806 356/237.1 |
| 8,135,206 B2 | * | 3/2012 | Sones | G06T 7/0004 382/142 |
| 8,324,559 B2 | * | 12/2012 | Kwirandt | G01N 21/9036 250/223 B |
| 8,532,364 B2 | * | 9/2013 | Urban | G01N 21/8806 382/149 |
| 8,615,125 B2 | * | 12/2013 | Mori | G06T 7/0004 382/141 |
| 8,670,032 B2 | * | 3/2014 | Hermann | G01N 21/9036 348/125 |
| 8,941,825 B2 | * | 1/2015 | Juvinall | G01N 21/90 356/239.4 |
| 9,027,612 B2 | * | 5/2015 | Yamakawa | B60C 11/0302 152/209.18 |
| 10,000,094 B2 | * | 6/2018 | Saeki | B60C 11/12 |
| 2001/0012394 A1 | * | 8/2001 | Yoshida | G06T 7/001 382/149 |
| 2002/0017349 A1 | * | 2/2002 | Lopez | B60C 11/1281 152/209.18 |
| 2002/0063215 A1 | * | 5/2002 | Yagita | G01N 21/9027 250/341.1 |
| 2004/0184031 A1 | * | 9/2004 | Vook | G06T 7/60 356/237.1 |
| 2004/0262523 A1 | * | 12/2004 | Bathelet | G01N 21/90 250/349 |
| 2004/0263838 A1 | * | 12/2004 | Diehr | G01N 21/21 356/239.1 |
| 2006/0086445 A1 | * | 4/2006 | Kishida | B60C 11/1218 152/209.18 |
| 2006/0118221 A1 | * | 6/2006 | Tsubono | B60C 11/1218 152/209.18 |
| 2006/0137793 A1 | * | 6/2006 | Nguyen | B60C 11/1218 152/209.18 |
| 2006/0169377 A1 | * | 8/2006 | Hashimoto | B60C 11/125 152/209.23 |
| 2006/0181700 A1 | * | 8/2006 | Andrews | G01N 21/474 356/237.2 |
| 2008/0291438 A1 | * | 11/2008 | Akkerman | B07C 5/3404 356/240.1 |
| 2009/0161943 A1 | * | 6/2009 | Yamashita | G01N 21/88 382/149 |
| 2009/0284733 A1 | * | 11/2009 | Wallingford | G01N 21/21 356/73 |
| 2009/0294674 A1 | * | 12/2009 | Bathelet | G01N 21/90 250/340 |
| 2010/0154953 A1 | * | 6/2010 | Kaji | B60C 11/1218 152/209.21 |
| 2010/0212794 A1 | * | 8/2010 | Watabe | B60C 11/11 152/209.18 |

(56) References Cited

U.S. PATENT DOCUMENTS

| | | | | |
|---|---|---|---|---|
| 2010/0224297 | A1* | 9/2010 | Kiwaki | B60C 11/1218 152/209.23 |
| 2011/0007148 | A1* | 1/2011 | Hermann | G01N 21/9036 348/127 |
| 2011/0048602 | A1* | 3/2011 | Hayashi | B60C 11/11 152/209.18 |
| 2011/0141265 | A1* | 6/2011 | Holtkamp | G01N 33/386 348/86 |
| 2011/0191073 | A1* | 8/2011 | Kim | G01B 11/26 703/2 |
| 2011/0254980 | A1* | 10/2011 | Perchant | G06T 7/80 348/231.99 |
| 2012/0026316 | A1* | 2/2012 | Nagahama | H01L 22/12 348/92 |
| 2012/0133933 | A1* | 5/2012 | Zou | G01N 21/65 356/301 |
| 2012/0180920 | A1* | 7/2012 | Nagayasu | B60C 11/1218 152/209.21 |
| 2012/0235036 | A1* | 9/2012 | Hatakeyama | H01J 37/265 250/310 |
| 2013/0078555 | A1* | 3/2013 | Orihara | G03F 1/60 430/5 |
| 2013/0081744 | A1* | 4/2013 | Kameda | B60C 11/1218 152/209.5 |
| 2013/0136315 | A1* | 5/2013 | Kawamoto | G06K 9/00442 382/112 |
| 2013/0271755 | A1* | 10/2013 | Lindner | G01N 21/90 356/240.1 |
| 2014/0002723 | A1* | 1/2014 | Cook | G06T 5/50 348/370 |
| 2014/0174127 | A1* | 6/2014 | Dalstra | C03B 9/41 65/29.11 |
| 2014/0177016 | A1* | 6/2014 | Wilsher | H04N 1/0005 358/504 |
| 2014/0261936 | A1* | 9/2014 | Iwamura | B60C 11/1218 152/209.18 |
| 2014/0299245 | A1* | 10/2014 | Kaji | B60C 11/1218 152/209.25 |
| 2015/0013865 | A1* | 1/2015 | Yoshikawa | B60C 11/1236 152/209.18 |
| 2015/0041034 | A1* | 2/2015 | Matsushita | B60C 11/04 152/209.24 |
| 2015/0151586 | A1* | 6/2015 | Furusawa | B60C 11/0302 152/209.25 |
| 2015/0266346 | A1* | 9/2015 | Kaji | B60C 11/1218 152/209.18 |

FOREIGN PATENT DOCUMENTS

| | | |
|---|---|---|
| JP | 2003083718 | 3/2003 |
| JP | 2003083718 A | 3/2003 |
| JP | 2011085454 | 4/2011 |
| RU | 2429466 | 9/2011 |
| WO | 2009121482 A1 | 10/2009 |

* cited by examiner

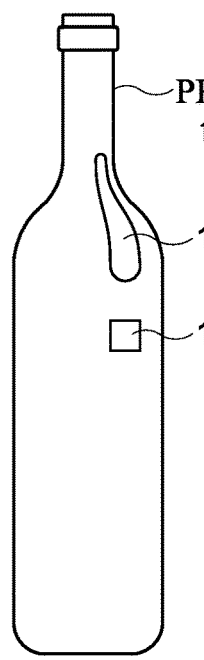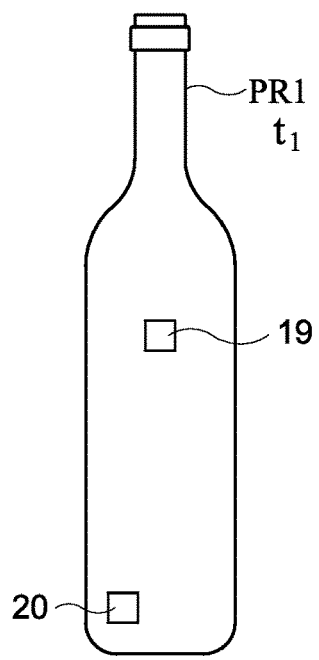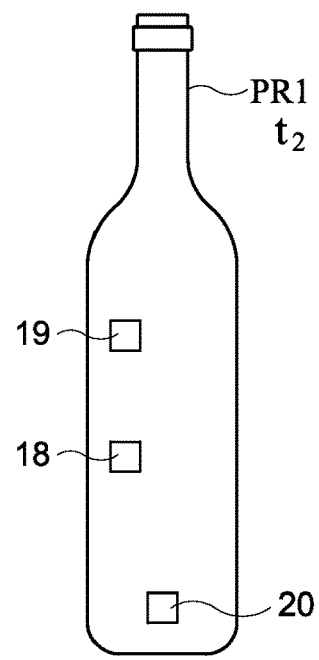
Fig. 3A    Fig. 3B    Fig. 3C
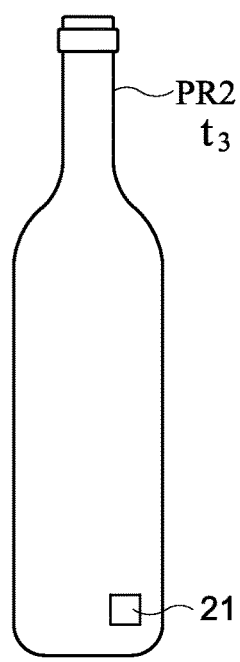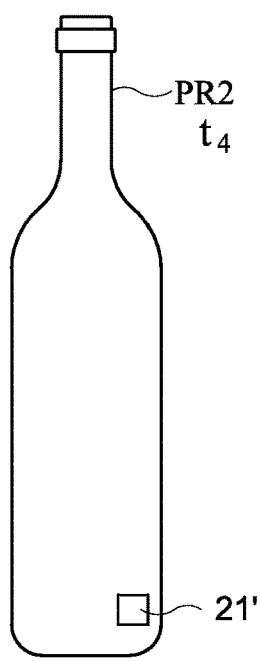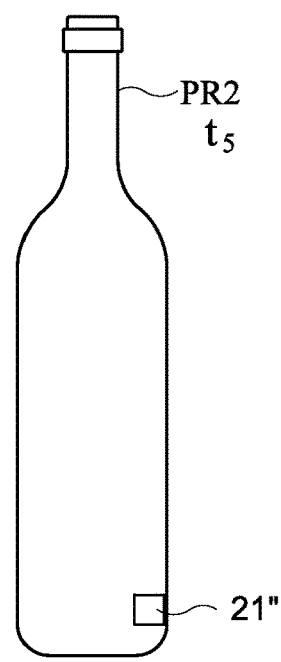
Fig. 4A    Fig. 4B    Fig. 4C

METHOD OF PRODUCING GLASS PRODUCTS FROM GLASS PRODUCT MATERIAL AND AN ASSEMBLY FOR PERFORMING SAID METHOD

TECHNICAL FIELD

The invention relates to a method of producing glass products, for example window panes, glass tubes, table glass, packaging glass, and/or glass containers, in particular bottles, from glass product material, said method comprises the steps of heating the glass product material, of shaping the heated glass product material into a glass product, of cooling the shaped glass product and of inspecting the shaped glass products by means of at least one light sensitive sensor, in particular a sensor which is sensitive to infrared radiation, for detecting whether said glass product comprises a defect or not. More particularly the invention relates to a method of producing glass products from glass product material, said method comprises the steps of:
 a. heating the glass product material;
 b. shaping the heated glass product material into a glass product;
 c. cooling the shaped glass product; and
 d. inspecting the shaped glass products by means of at least one light sensitive sensor, in particular by means of a sensor which is sensitive to infrared radiation.

BACKGROUND

In the field of fabrication of glass products, it is known to utilise infrared radiation emitted by products leaving the moulding machine in order to perform control or inspection with a view to detect possible defects on the surface or inside products. The quality control of such products can also be used to provide a feedback for the process parameters. A locally increased intensity of the emitted radiation may be caused by a real defect. Also a locally decreased emitted radiation may be caused by a real defect. A real defect may be caused by a locally change in the glass distribution (e.g. a locally changed glass thickness) and/or a locally change in temperature distribution. A real defect may also be caused by a bubble in the glass product or an inclusion in the glass product. Thus a real defect may be recognised in a locally increased or decreased intensity of the infrared radiation emitted by the glass product.
This information can be used for alarming the operators to take the right remedial action or for automatic controlling the glass forming process.

Measuring infrared radiation for a glass product is however prone to errors due to other sources of infrared radiation which radiation is reflected in or on the surface under inspection. For example, these sources of infrared radiation considered as parasitic can be products placed upstream or downstream of the inspected glass product, glass products located on another production line and other sources of infrared radiation in the production facility. These sources may provide reflections on the glass product to be inspected which may be wrongly detected as defects in the glass product. Another source of parasitic reflections stems from internal reflections of the glass product to be inspected itself. Such internal reflections may occur due to the surface of the product not being smooth. The surface may for example comprises sudden transitions such as transitions formed by facets, embossed surfaces and engraved surfaces. Internal reflections also occur in the mouth of a bottle and a pot because such areas comprise changing wall thicknesses and/or screw thread.

All these parasitic reflections can also negatively influence the measurement of changes in the glass distribution or temperature distribution in the glass product. The parasitic reflections can occur in an area with low intensity of infrared radiation and lead to a wrong conclusion about the change in the glass or temperature distribution of the glass product.

In a method known from US-A1-2009/0294674 these parasite reflections are eliminated by using a polariser whereof the polarisation vector is substantially orthogonal to the polarisation vector of the beams reflected by the inspected product. However, in particular when glass products having curved shapes are inspected the beams of infrared radiation reflected from the curved parts of the products can have a plurality of polarisation vectors, so that the use of a single polariser can not or only with extreme complexity eliminate such parasite reflections.

SUMMARY OF THE DISCLOSURE

It is therefore an object of the invention to provide an improved method in which incorrect influences of parasite reflections on the interpretation of measurements on the glass product can be eliminated regardless of the shape of the products. It is another object of the invention to eliminate the effect of parasite reflections in an easy way.

According to the invention it holds that said inspecting step comprises:
 e. taking a plurality of images of the glass product under a plurality of mutually different viewing directions relative to the product respectively; and
 f. comparing the plurality of images for detecting a defect in the product and possibly determine an extension of such defect.

By comparing in step f. the plurality of images, a potential defect which for example occurs in only one of the images or in only a minority of the images on the same position of the object or in less than a predetermined number of images on the same position of the object may be ignored or classified as a parasitic defect. Alternatively or additionally by comparing in step f. the plurality of images, a potential defect which occurs on different positions of the product within the plurality of images may be ignored or classified as a parasitic defect. Alternatively or additionally by comparing in step f. the plurality of images, a potential defect which for example occurs in each of the images on the same position of the product or in the majority of the images on the same position of the product or in at least a predetermined number of images on the same position of the product may be classified as a real defect.

A real defect is for example defined as a locally changed glass distribution or locally changed temperature distribution or a locally different infrared radiation pattern, each due to deformation of the glass product or each due to the presence of non-glass particles, like stone or metal, in the glass product.

A parasitic reflection in nearly all cases is only reflected from the glass product under a certain viewing direction relative to the product. This means that, taking a plurality of images of the glass product will cause that the parasitic reflection occurs in only one image or in only a minority of the images on the same position of the product or in different images on different positions of the glass product. Based on this insight the parasitic reflection can be recognized and/or ignored. The difference of the position of the parasitic reflections in the images of the glass products is dependent on the surface normal and the directions of the origins of the reflections. Real defects will however be visible on the same position of the object in the plurality of images. Thus real defects will have different positions in the images, but because the viewing direction of the image is known or measured, it can be checked whether such defects are on the same position of the product. Based on this insight real defects can be detected.

In other words, because the viewing directions are known it can be checked for which images of the plurality of images the defects are on the same position of the product.

In a preferred embodiment of a method according to the invention the plurality of images are taken by the same sensor. In order to be able to take the images under different viewing angles the glass products and the sensor then have to be displaced relative to each other.

However, additionally or alternatively the method comprises the steps of providing an optical system, and of using said optical system in taking either one of the plurality of images of said glass product. Such an optical system can e.g. comprise mirrors, lenses, prisms, etc. which may or may not be movable to assist in taking the images under different viewing angles. For example, the optical system can be positioned such as to direct or reflect infrared radiation emitted by the glass product towards the sensor or the sensors.

Additionally or alternatively the plurality of images can be taken by different sensors.

When in an embodiment of the method according to the invention at least two sensors are used, said at least two sensors being positioned on either side of the glass product, it is possible to provide a substantial complete image of the glass product in an easy way. On the other hand it is also possible to provide a substantial complete image of the glass product by any other number of sensors.

A particularly advantageous method is provided when the shaped glass product is conveyed by means of a conveyor, and wherein the images are taken during conveyance. Preferably the method further comprises the steps of placing a plurality of shaped glass products on the conveyor; simultaneously conveying said plurality of shaped glass products by means of the conveyor; and alternately taking images of different glass products. In this way it is possible to inspect a plurality of glass products by one sensor or optionally two or more sensors arranged at either side of the conveyor.

The invention also relates to an assembly for performing the method of producing glass products from glass product material in accordance with the invention, said assembly comprising:

a heating unit for heating the glass product material;

a product-shaping unit for shaping the heated glass product material into a glass product;

an annealing surface for cooling the shaped glass product;

an inspecting unit for inspecting the shaped glass product, said inspecting unit comprising at least one light sensitive sensor wherein the sensor is in particular sensitive to infrared radiation; and a control and processing unit connected to the at least one sensor for receiving output signals delivered by the at least one sensor indicative for at least one image of the glass product and adapted for determining whether a glass product comprises defects in the product and possibly determining an extend of such defect; wherein the inspection unit is arranged for taking a plurality of images of the glass product under a plurality of mutually different viewing directions relative to the product respectively; and wherein the processing unit is arranged for comparing the plurality of images for detecting a defect in the product and possibly determine an extension of such defect.

Further embodiments of the assembly are described in the dependent assembly claims.

Further objects, features, effects, advantages and details of the invention are described with reference to examples shown in the drawings

BRIEF DESCRIPTION OF THE DRAWINGS

The invention will now be illustrated, in a non-limiting way, with reference to the accompanying drawing, wherein:

FIG. 3A-3C show images of a glass product PR1 taken under different viewing directions;

FIGS. 4A-4C show images of a glass product PR2 taken under different viewing directions;

DETAILED DESCRIPTION

Figure 1:
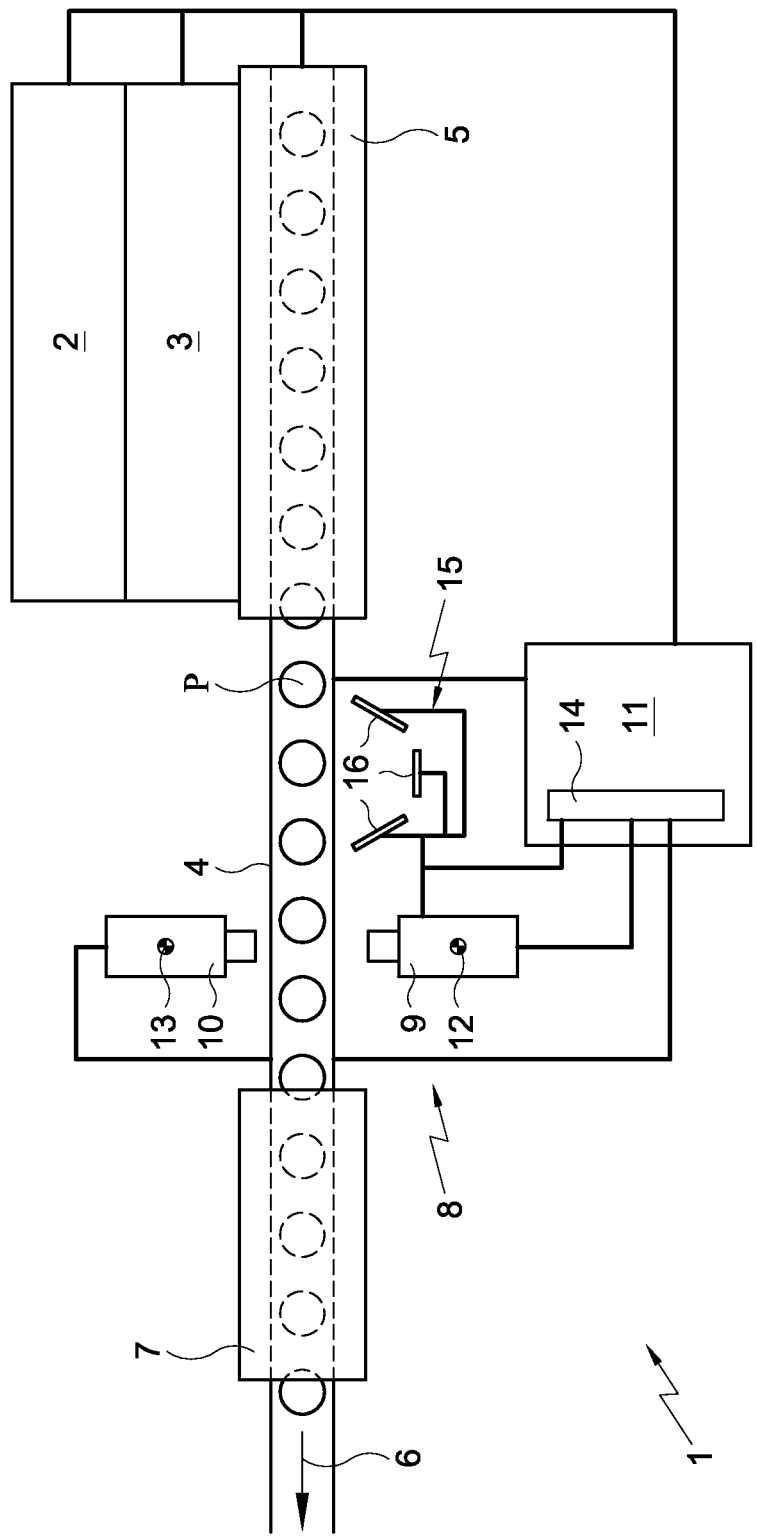
FIG. 1 schematically shows an assembly for producing glass products from glass product material in accordance with the invention.

In FIG. 1 an exemplary embodiment of an assembly 1 for producing glass products P from glass product material in accordance with the invention is shown. In the described exemplary embodiment the glass products are bottles, but also other glass products, such as window panes, glass tubes, table glass, packaging glass, and/or glass containers can be produced in accordance with the inventive method and in the inventive assembly.

In this embodiment the assembly 1 comprises a schematically shown heating unit 2 for heating the glass product material. The heated material is transferred to a product-shaping unit 3, if required together with other materials and/or semi-manufactured products, not further specified. In this embodiment the product-shaping unit 3 simultaneously shapes six glass products. The six glass products, which are still hot immediately after shaping, are simultaneously placed on a conveyor 4 by a placing unit 5. The product-shaping unit 3 comprises moulds known per se in which a portion of heated glass product material is deposited and blowing means for blowing or pressing the glass product material in the mould to obtain the final shape. Please note that although in the embodiment shown six glass products are simultaneously shaped and placed on the conveyor, the present invention is particular applicable to any plurality of two or more glass products, but would also be applicable to the repeated production of only one glass product.

The simultaneously shaped products P are also simultaneously conveyed in the direction of the arrow 6, while gradually cooling. For this purpose, the assembly is provided with, e.g., an annealing furnace 7, not further specified. As indicated in FIG. 1 previously shaped glass products are being cooled in the annealing furnace 7, while a still earlier produced and cooled glass product has (almost) left the annealing furnace 7 and is conveyed for further processing.

The shaped glass products are one-by-one passed along an inspecting unit 8 for inspecting the shaped glass product. This inspecting unit comprising at least one sensor 9, 10 (in the embodiment of FIG. 1 two sensors are present at either side of the conveyor 4) sensitive to infrared radiation. Such a sensor can be formed by e.g. a camera sensitive to infrared radiation or a detector element comprising infrared-sensitive pixels arranged in vertical and/or vertical and horizontal rows. A locally increased intensity of the emitted radiation may be caused by a real defect. Also a locally decreased emitted radiation may be caused by a real defect. A real defect may be caused by a locally change in the glass distribution (e.g. a locally changed glass thickness) and/or a locally change in temperature distribution. A real defect may also be caused by a bubble in the glass product or an inclusion in the glass product. Thus a real defect may be recognised in a locally increased or decreased intensity of the infrared radiation emitted by the glass product.

The assembly 1 also comprises a control and processing unit 11 which is connected to the two sensors 9, 10 for receiving output signals indicative for an image of the glass product delivered by the two sensors and adapted for determining whether a glass product is defective or not. The output signals of the two sensors can in fact be images of the complete glass product or images of portions of the glass products, in case the sensors are formed by cameras.

The control and processing unit 11 is adapted to control the sensors 9, 10 such that a first image of the glass product is taken under a first viewing direction relative to a glass product and a second image of the same glass product is taken under a second viewing direction relative to the glass product which is different from the first direction. In order to realize this, the sensors 9, 10 are e.g. rotatably arranged around rotation axis 12, 13 respectively, and the control and processing unit 11 controls the rotation of the sensors 9, 10. If necessary or desired a further image of the glass product can be taken under a further viewing angle which is different from both the first viewing angle and the second viewing angle, as will be elucidated with reference to FIG. 2 below.

The control and processing unit 11 comprises a comparison unit 14 which is adapted, e.g. suitably programmed, for comparing the first image with the second image, and optionally the further image with the first and/or second images of the glass product for eliminating parasite reflections, as will schematically be described with reference to FIGS. 3-5 below. In addition the comparison unit 14 is adapted, e.g. suitably programmed, to analyze the images for detecting in an accurate manner deviations in the product and possibly determine the extent of such deviations. If such deviations are determined it is possible to determine whether a glass product is defective or not, for example by comparing the detected deviation with predetermined criteria.

In a manner known per se the comparison unit 14 can generate control signals to adapt or regulate process parameters of the assembly and/or, on the other hand, to intervene in the production process, e.g. by automatically rejecting a defective glass product.

The inspecting unit 8 is preferably so positioned that, seen in the direction of the arrow 6, glass products are measured before entering the annealing furnace 7. When detected by the inspecting unit 8, the glass products shaped can have a temperature above 100° C. or even above 400° C., so that they are emitting infrared radiation. Defects in a glass product will emit infrared radiation at a different intensity then normally. When, e.g., at specific positions of a glass product the intensity difference exceeds a specific threshold value or drops below another threshold value, a signal indicating that the product contains a deviation at these places can be generated by the control and processing unit 11. More in particular, such a signal is generated when it turns out that a number of products contain such an intensity difference successively at the same places. The specific threshold values may be different for different portions of the product. However, parasite reflections from a glass product under inspection can interfere with this determination of glass defects. Such parasite reflections may be the result of infrared radiation emitted by a neighbouring glass product and reflected from the surface of the glass product under inspection. In particular when a plurality of glass products is conveyed simultaneously such parasite reflections occur more often then is desired. Another source of parasitic reflections stems from internal reflections of the glass product to be inspected itself. Such internal reflections may occur due to the surface of the product not being smooth. The surface may for example comprises sudden transitions such as transitions formed by facets, embossed surfaces and engraved surfaces. Internal reflections also occur in the mouth of a bottle and a pot because such areas comprise changing wall thicknesses and/or screw thread. It is just all of these types of parasite reflections that can be eliminated or ignored by the inventive assembly and method. These parasite reflections always generate a locally increased intensity of the infrared radiation.

In addition to the sensors 9, 10 an optical system 15 can be used for taking either one of the first, second and/or further images of said glass product. Such an optical system can e.g. comprise mirrors, lenses, prisms, or arrays 16 of infrared-sensitive pixels etc. which may or may not be movable to assist in taking the images under different viewing angles. For example, the optical system 15 can be positioned such as to direct or reflect infrared radiation emitted by the glass product towards the sensor 9. In that case the sensor 9 may be fixed wherein the optical system 15 comprises rotating parts for obtaining images from one and the same product on different moments in time when the product is conveyed. This will provide different images from different viewing directions relative to the product respectively. In an alternative embodiment such an optical system may form the sensor as such.

In operation, controlled by the control and processing unit 11, the assembly described above performs a method of producing glass products from glass product material. In this inventive method the glass product material is heated by the heating unit 2, where after the heated glass product material is shaped so that a plurality of glass products is simultaneously shaped by the shaping unit 3. The plurality of shaped glass products is placed on the conveyor 4 and simultaneously conveyed to finally being cooled by the annealing furnace 7.

Before entering the annealing furnace 7 the glass products are inspected for defects and an example of possible results of such an inspection will be described now with reference to FIGS. 2A-2C.

Figure 2A:
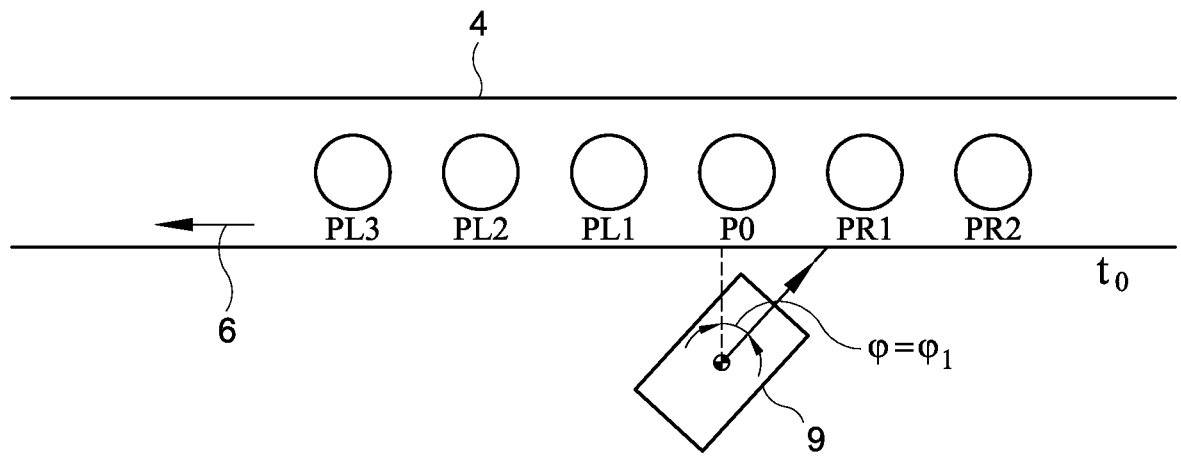
FIGS. 2A-2C show a part of a conveyor of the assembly of FIG. 1 conveying a plurality of glass products and a camera at three different moments during conveyance.
Figure 2B:
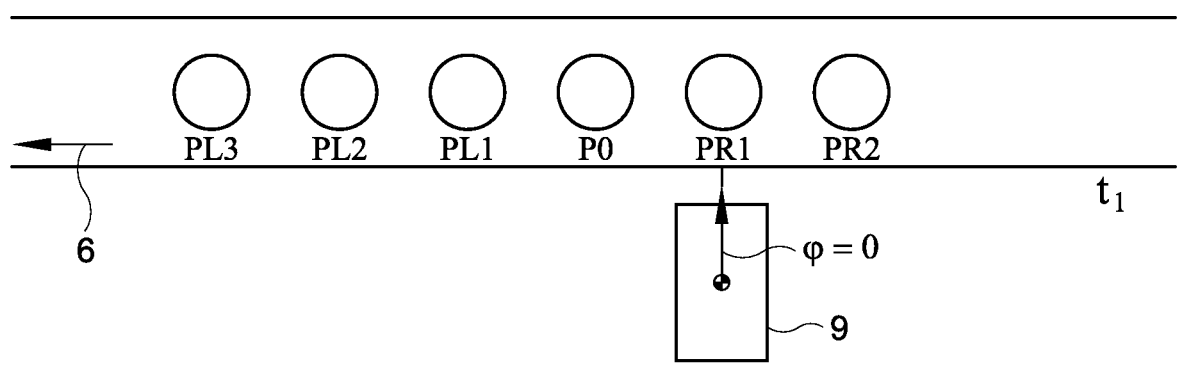
Figure 2C:
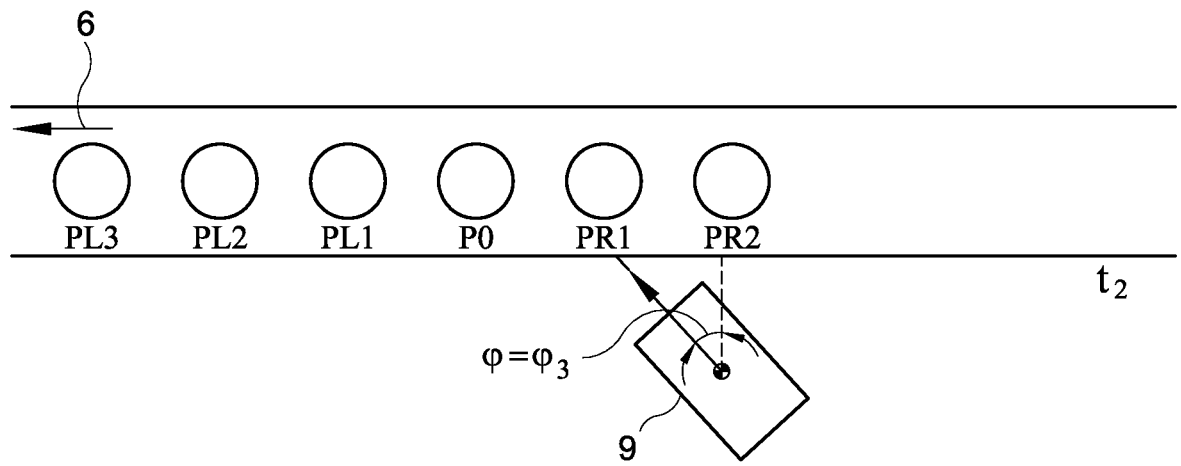

In these FIGS. 2A-2C only one camera 9 is shown but it will be clear that the same description applies to the other camera 10 or possible other sensors or optical systems present.

In FIG. 2A a plurality of six glass products PR2, PR1, PR0, PL1, PL2 and PL3 are shown at a moment $t_0$. These six glass products are simultaneously conveyed on the conveyor 4. The control and processing unit receives or retrieves information regarding conveyor speed and the angle φ (i.e. the viewing angle) under which the camera is orientated with regard to the conveyor, which information is used to control taking the images of the glass products and to analyze the images for possible defects. In this example the viewing direction relative to the product is defined as the viewing angle φ relative to the transport direction 6 of the products. Such information can for example be provided by stepper motors, encoders etc. used to drive the conveyor belt and/or the rotation of the camera.

In FIG. 2A the camera 9 is rotated such as to take a first image of the glass product PR1 at $t_0$ under the first angle φ=φ1 (=first viewing direction relative to the product=first viewing angle). This first image is represented in FIG. 3A. In this image it can be seen that e.g. area 17 and area 19 each displays a locally infrared intensity which is larger than the other parts of the glass product PR1. Thus both areas show a potential defect in FIG. 3A. Based on this image alone it can not be deduced with certainty whether these areas indicate a real defect in the glass product or not. Since however the glass product PR1 is transported in the direction indicated by arrow 6 a second image will be taken by the camera 9 at a second moment $t_1$ under a second angle φ=0 (=second viewing direction relative to the product=second viewing angle) which is different from the first angle φ. This is indicated in FIG. 2B in which it is shown that the glass product PR1 has been conveyed over a distance such that the viewing direction under which the second image can be taken is 0 degrees. Under control of the control and processing unit the camera 9 is rotated such that this second image can be taken correctly. The second image is shown in FIG. 3B. In this image the area 17 with locally increased infrared intensity (=potential defect) is not present anymore. The area 19 with locally increased infrared intensity (=potential defect) is however still present in FIG. 3B.

Since however the glass product PR1 is transported in the direction indicated by arrow 6 a third image will be taken by the camera 9 at a third moment $t_2$ under a second angle φ=φ3 (=third viewing direction relative to the product=third viewing angle) which is different from the first angle φ. This is indicated in FIG. 2C in which it is shown that the glass product PR1 has been conveyed over a distance such that the viewing direction under which the second image can be taken is φ3 degrees. Under control of the control and processing unit the camera 9 is rotated such that this third image can be taken correctly. The third image is shown in FIG. 3C. In this image the area 17 with locally increased infrared intensity is also not present anymore. However an area 18 with locally increased infrared intensity is present in FIG. 3C. Thus in this example the assembly is also arranged for taking at least one further image of the glass product under a further viewing direction (φ=φ3) relative to the product, said further viewing direction being different from the first viewing direction and being different from the second viewing direction. Based on comparison of the images of FIG. 3A and FIG. 3B the comparison unit of the control and processing unit can derive that the area 17 is due to reflection (or refraction) and is not caused by any real defect. The area 17 indicating parasite reflections can thus eliminated from the image. Please note that based on the known conveyor speed the control and processing unit could extrapolate from the image of FIG. 3A where the area 17 of increased infrared intensity would be present in the image of FIG. 3B (i.e. under the viewing direction of 0 degrees). This would be on the same position of the product as in FIG. 3A. In case such an area is not present in the real second image or present at a different position, this also can be used to eliminate or ignore the potential defect. Ignore may mean in this context that no further actions in the product making process are taken in response to the detected potential defect. Eliminate may mean that in the image of the product the potential defect is deleted. It may also be that the potential defect is classified as a parasite reflection. This may be done by showing a label in the image of the product which indicates a parasitic reflection. Thus in this case the area 17 will not be classified as a real defect. The area 17 may be ignored or may be classified as a parasitic reflection. However based on comparison of the images of FIG. 3A and FIG. 3B the comparison unit of the control and processing unit can determine that the area 19 is due to a real defect because it is present in both images on the same position of the product. Please note that based on the known conveyor speed the control and processing unit could extrapolate from the image of FIG. 3A where the area 19 of increased infrared intensity would have to be present in the image of FIG. 3B (i.e. under the viewing direction of 0 degrees). This would be on the same position of the product as in FIG. 3A. In case such an area is present in the image of FIG. 3B, this area can be classified as a real defect. If the potential defect is classified as a real defect the control and processing unit may be arranged to take further actions such as labelling the defect as a real defect in the image of the product. Also the control and processing unit may be arranged to determine the extension, size and/or dimensions of the real defect. Also the control and processing unit may be arranged to generate an alarm, remove the product from the conveyor or adapt the process for making the product in response to the detection of the real defect.

In addition the image of FIG. 3C may also be used for investigating the product. By comparing this image of FIG. 3C with the image of FIG. 3A and image of FIG. 3B it follows that this area 18 of increased intensity indeed indicates a parasite reflection and not a defect in the glass product because this area 18 is also not present in the third image. Furthermore the area 19 is also present in the image of FIG. 3C which indeed confirms that this area has a real defect. In addition the image of FIG. 3C shows an area 18 with locally increased intensity. Thus this is a potential defect. Because this area is not present in the first image shown in FIG. 3A or the second image shown in FIG. 3B this area 18 is not classified as a real defect. The control and processing unit is in this case arranged to ignore the potential defect 18 or to classify the potential defect as a parasitic reflection. Finally it is observed that FIG. 3B shows an area 20 with a locally increased infrared intensity. This area 20 is also a potential defect. However in FIG. 3C it appears that this potential defect is also present in an area 20" of the product which is shifted relative to the area 20. Such an area is also regarded as a parasitic reflection because parasitic reflections will in general not be present in two or more images or be present in two or more images on different positions (areas) of the product.

By suitable rotating the camera 9 and storing all relevant information such as viewing directions/angles, position of conveyor belt, it is possible to alternately take images under different viewing directions/angles of all the glass products of the plurality of glass product which are simultaneously conveyed.

Thus, as explained above, the control and processing unit is arranged to determine whether or not a potential defect, which is visible in a first image (in this example FIG. 3A) and located on a first position 17, 19 of the glass product, is also visible in the at least one second image (in this example FIG. 3B) on the first position 17, 19 of the product. Furthermore the control and processing unit is arranged to classify a potential defect 19 as a real defect if the potential defect which is visible in the first image (in this example FIG. 3A) and located on the first position 19 of the glass product is also visible in the at least one second image (in this example FIG. 3B) on the first position 19 of the product.

The control and processing unit is also arranged to determine whether or not a potential defect which is visible in a first image (for example FIG. 3B) and located on a first position 20 is also visible in the at least one second image (for example FIG. 3C) on a second position 20' of the product wherein the first position 20 differs from the second position 20'.

In this example the control and processing unit will not classify the potential defect 20, 20' as a real defect if the potential defect, which is visible in the first image (for example FIG. 3B) and located on the first position, is also visible in the at least one second image (for example FIG. 3C) on a second position of the product wherein the first position 20 differs from the second position 20'.

Furthermore in this example the control and processing unit will classify the potential defect 20 as a parasitic reflection if the potential defect 20, which is visible in the first image (for example FIG. 3B) and located on the first position 20, is also visible in the at least one second image (for example FIG. 3C) on a second position 20' of the product wherein the first position 20 differs from the second position 20'.

The control and processing unit is also arranged to determine whether or not a potential defect, which is visible in the first image (for example FIG. 3A) and located on a first position 17 of the glass product, is not visible in the at least one second image (for example FIG. 3B). In this example the control and processing unit classifies the potential defect not as a real defect if the potential defect (for example the potential defect visible at position 17 in FIG. 3A), which is visible in the first image and located on a first position of the glass product, is not visible in the at least one second image (for example FIG. 3B). In this example the control and processing unit is arranged to classify the potential defect 17 as a parasitic reflection if the potential defect which is visible in the first image and located on a first position 17 of the glass product is not visible in the at least one second image (FIG. 3B and/or FIG. 3C).

It follows from the above that in this example FIG. 3A may be considered as a first image and FIG. 3B may be considered as a second image for comparing the first image and the second image as explained above. Also FIG. 3B may be considered as a first image and FIG. 3C may be considered as a second image for comparing the first image and the second image as explained above.

It is however also possible to compare three or more images for investigating one and the same product. An example will be provided how the control and processing unit could be arranged to compare more than two images.

The control and processing unit could for example be arranged to determine whether or not a potential defect, which is visible in the first image (in this example FIG. 3A) on a first position 19 of the product, is also visible in the second image (in this example FIG. 3B) on the first position of the product and in the at least one further image (in this example FIG. 3C) on the first position of the product and wherein, if any or preferably both conditions are met, the potential defect is classified as a real defect.

Also the control and processing unit could, for example, be arranged to determine whether or not a potential defect, which is visible in the first image (for example FIG. 4A showing an image of product PR2 with φ=φ1 taken at t=t3 wherein t3 lays slightly before t1) and located on a first position 21 of the product PR2, is also visible in a second image (for example FIG. 4B showing an image of product PR2 with φ=0 taken at t=t4 wherein t4 lays slightly before t2) on a second position 21' of the product and in the at least one further image (for example FIG. 4A showing an image of product PR2 with φ=φ3 taken at t=t5 wherein t5−t4 is the same as t4−t3, t2−t1 and t1−t0)) on a third position 21" of the product wherein if the first position 21 differs from the second position 21' and/or the first position 21 differs from the third position 21' the potential defect is not classified as real defect, ignored and/or classified as a parasitic reflection. Please note in this respect that the position 21 of the product differs from the position 21' of the product because FIG. 4A shows the product PR2 from a different direction of view than FIG. 4B. Also the position 21' of the product differs from the position 21" of the product because FIG. 4b shows the product PR2 from a different direction of view than FIG. 4C.

Also the control and processing unit may be arranged such that it determines whether or not a potential defect, which is visible in the first image and located on the first position 17 (see for example FIG. 3A) of the product, is not visible in the second image (see for example FIG. 3B) and/or not visible in the at least one further image (see for example FIG. 3C) preferably wherein, if any of the conditions are met, the potential defect is not classified as a real defect, ignored or classified as a parasitic reflection by the control and processing unit.

More generally an example of the assembly may be described to work as follows if a plurality (=two or more) of images are compared for one and the same product.

The control and processing unit may be arranged to compare the plurality of images and ignoring a potential defect or classifying a potential defect as a parasitic defect if the potential defect occurs in only one of the images or in only a minority of the images on the same position of the object or in less than a predetermined number of images on the same position of the object. A minority means for example less than 50%. If for example 5 images are compared, a minority of the images means less than 3. If for example 6 images are compared, a minority of the images also means less than 3. If for example 4 images are compared, the predetermined number may for example be 3.

The control and processing unit may be arranged to compare the plurality of images and ignoring a potential defect or classifying a potential defect as a parasitic defect if the potential defect occurs on different positions of the product within the plurality of images. If for example 4 images are compared and the potential defect shows up at least two images, the potential defect may be ignored or classified as a parasitic defect. Alternatively if for example 4 images are compared and the potential defect shows up in at least three images, the potential defect may be ignored or classified as a parasitic defect. Alternatively if for example 4 images are compared and the potential defect shows up in each of the images, the potential defect may be ignored or classified as a parasitic defect.

The control and processing unit may be arranged to compare the plurality of images and compare the plurality of images and classifying a potential defect as a real defect if the potential defect occurs in each of the images on the same position of the product or in the majority of the images on the same position of the product or in at least a predetermined number of images on the same position of the product. A majority of the images has the same meaning as above, Thus the control and processing unit may be arranged to locate in the plurality of images a position of the product which shows a potential defect in at least a predetermined number of images of the plurality of images, preferably in each of the images. A potential defect may for example be classified as a defect if the potential defect is located on the same position of the product in at least the predetermined number of images of the plurality of images.

For example if four images are available it is tried to locate a potential defect which shows up in at least three of the images. A potential defect may for example be classified as a defect if the potential defect is located on the same.

Figure 5A:
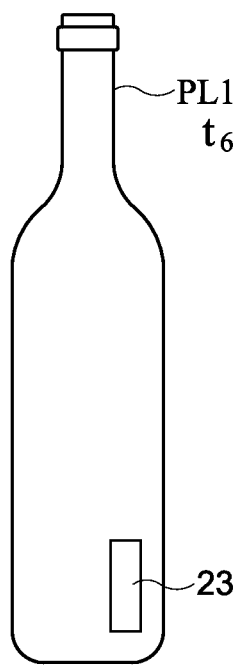
FIGS. 5A-5C show images of a glass product PL1 taken under different viewing directions.
Figure 5B:
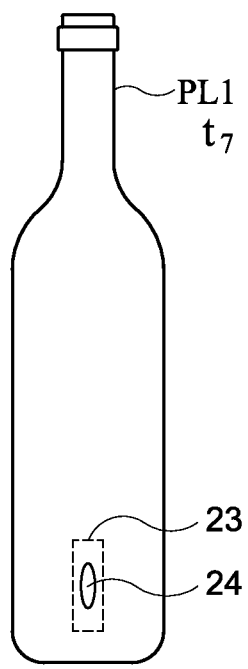
Figure 5C:
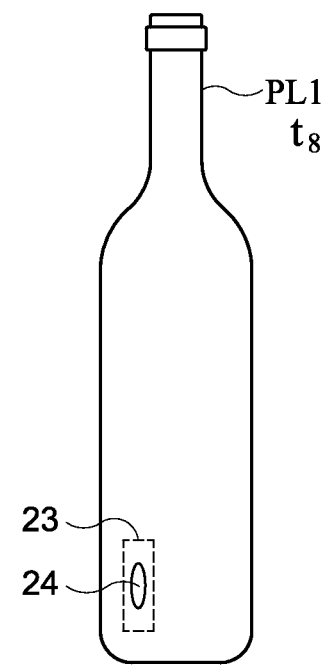
Figure 6A:
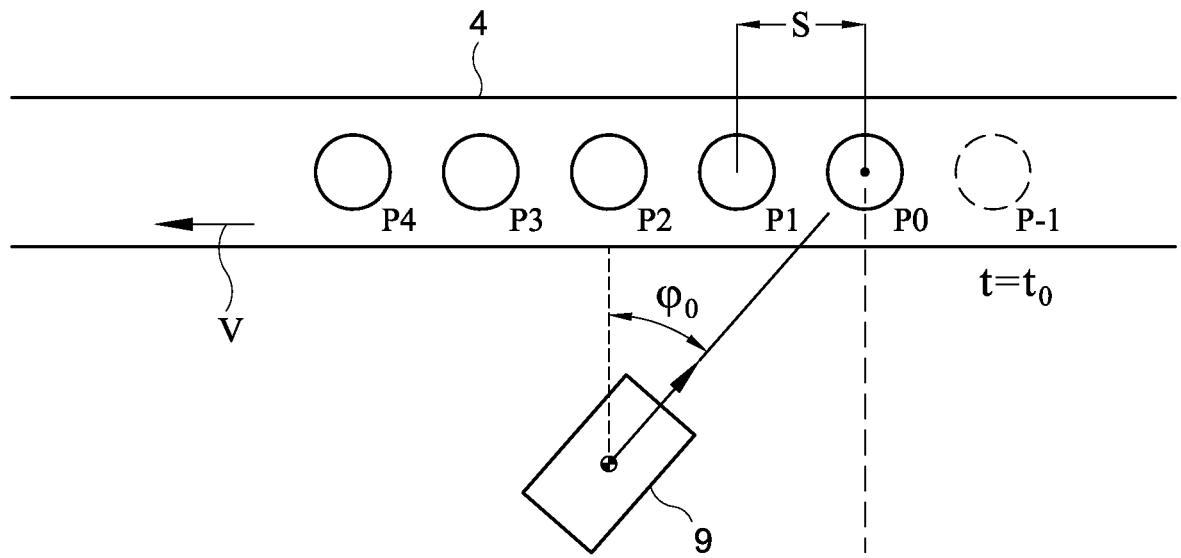
FIGS. 6A-6E show a part of a conveyor of the assembly of FIG. 1 conveying a plurality of glass products and a camera at five different moments in time during conveyance.
Figure 6B:
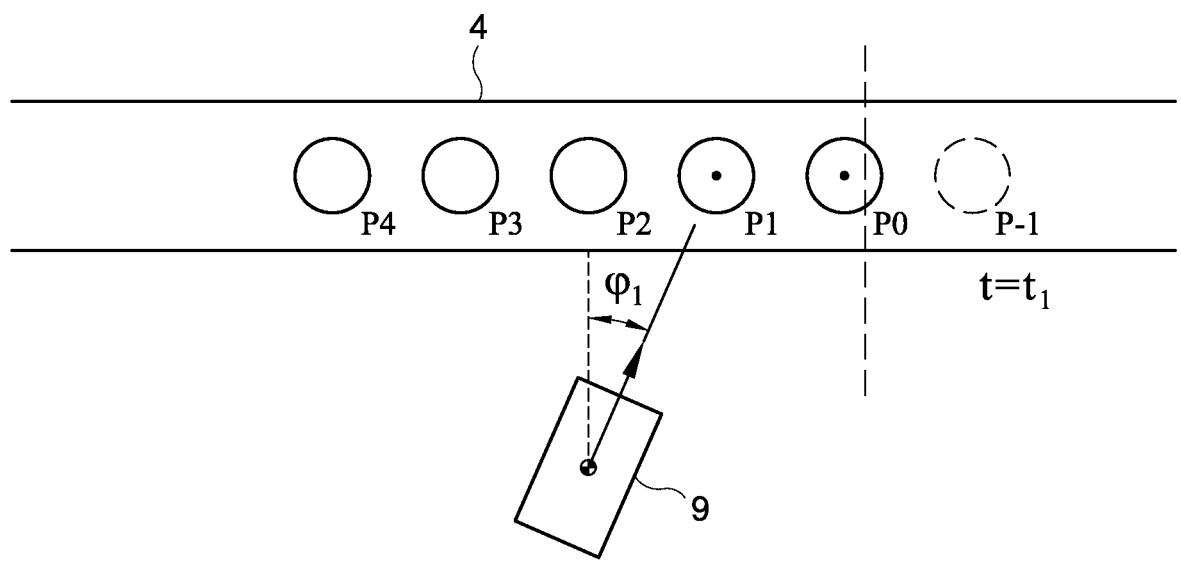
Figure 6C:
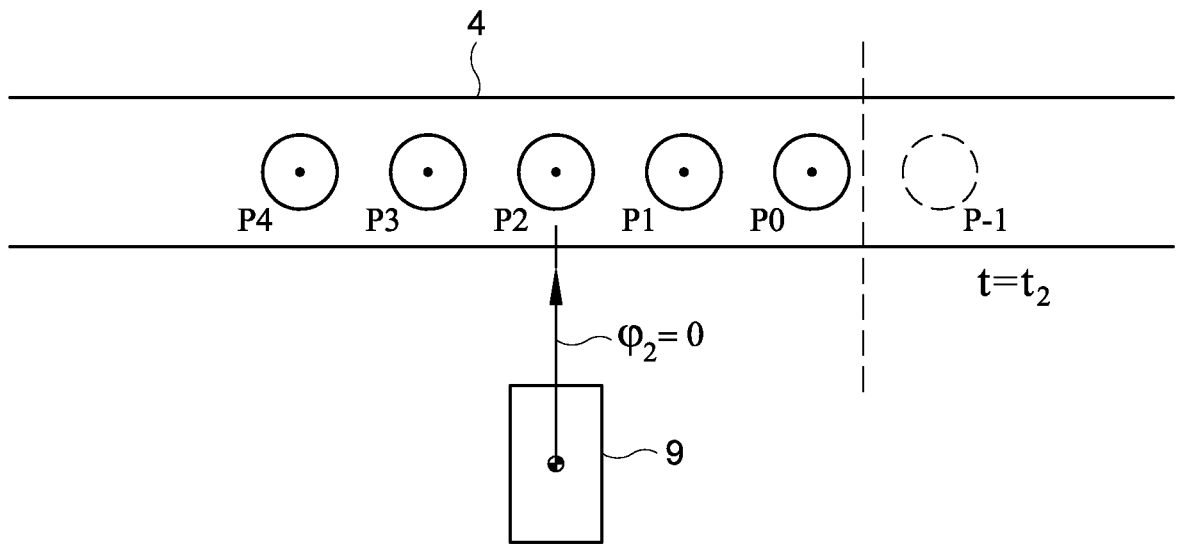
Figure 6D:
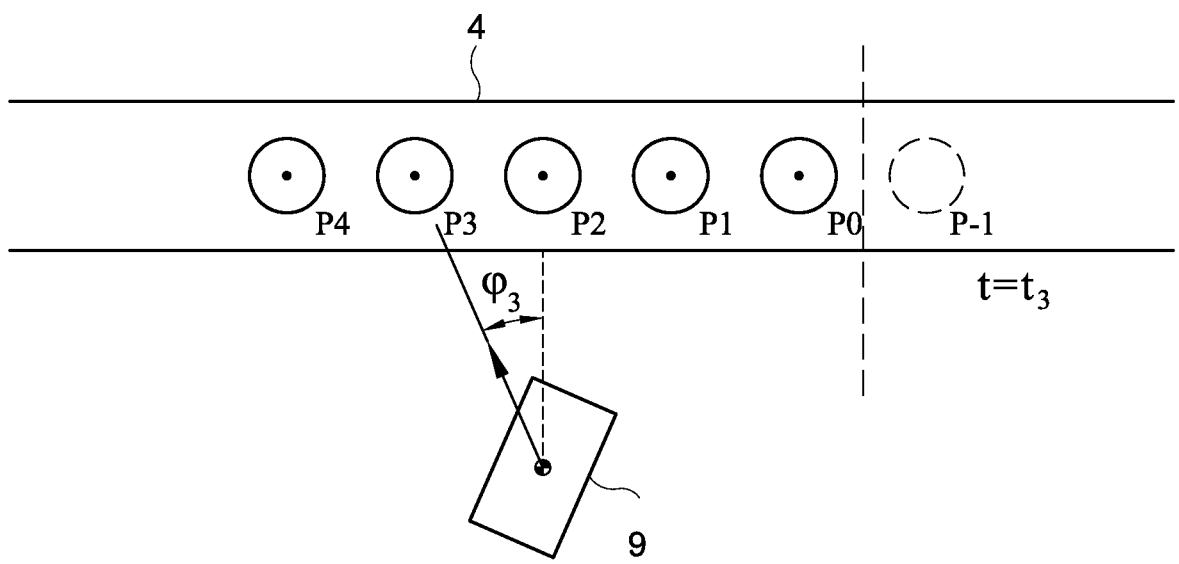
Figure 6E:
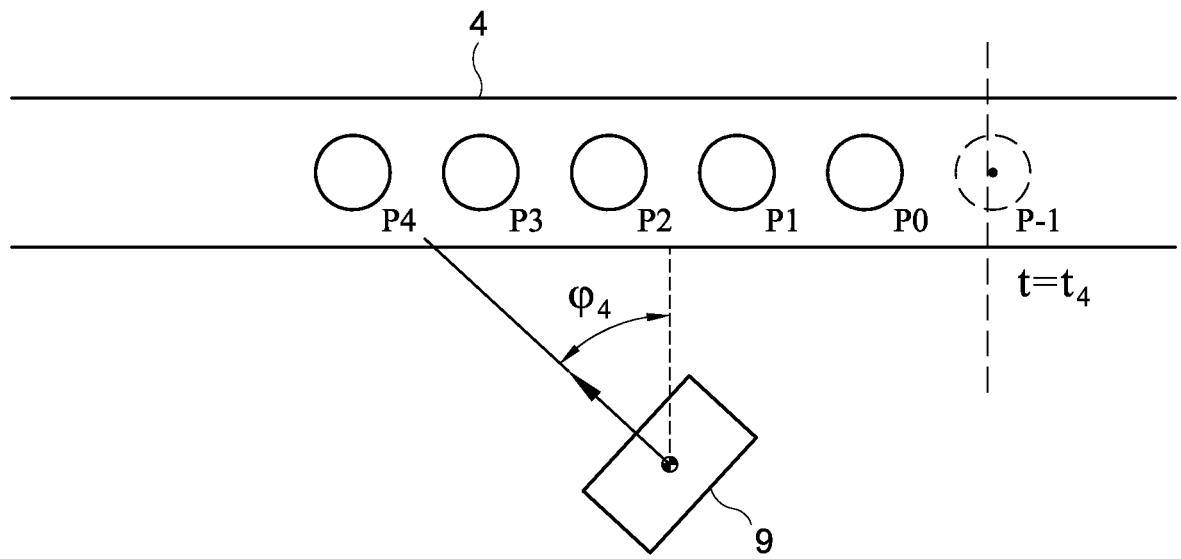

Another possibility might be that a real defect is 'hidden' within a parasite reflection. This situation is illustrated in FIGS. 5A-5C in which images of glass product PL1 are shown. In the first image shown in FIG. 5A an area 23 of increased intensity can be seen. After further conveyance a second image is taken of glass product PL1 which is shown in FIG. 5B. In this position it would be expected that the area 23 would be present at the position indicated with interrupted lines. As can be seen, only an area 24 of e.g. increased intensity is present. In order to analyze whether or not this area 24 is a parasite reflection or not use can be made of the third image as indicated in FIG. 5C. In this image the area 24 is still present, thereby indicating with more certainty that this area 24 is representative of a real defect. Note that a reflection always has an increased infrared radiation, but a defect can have a decreased or increased infrared radiation. But if a reflection occurs on the same area as a defect with a decreased reflection, like FIG. 5A, one cannot tell from FIG. 5A alone this is a defect or not, because of the increased value of the infrared by the reflection.

In the above examples it was described how for example three images from three mutually different viewing directions can be obtained for product PR1 and product PR2. It will be clear that in the same way three images from three mutually viewing directions can be obtained for each of the products. More generally in the same way n images (n=2, 3, 4, ... ) from n mutually viewing directions can be obtained for each of the products.

Another example is shown in FIGS. 6A-6E for products Pj (j=0, +/−1, +/−2, +/−3, ... ). In this example the velocity of the conveyor 4 is v and the distance between adjacent product on the conveyor is S.

On t=t0 an image of product P0 with $\varphi=\varphi 0$ is obtained. On t=t1 an image of product P1 with $\varphi=\varphi 1$ is obtained. On t=t2 an image of product P2 with $\varphi=\varphi 2$ is obtained. On t=t3 an image of product P3 with $\varphi=\varphi 3$ is obtained. On t=t4 an image of product P4 with $\varphi=\varphi 4$ is obtained. It holds that t4−t0=C is smaller than S/v (for example 10 times smaller). It also holds that $t_i - t_{i-1} = C/4$ for i=1, 2, 3, 4. This means that within the time period t0−t4 the products are only moved by the conveyor over a distance smaller than S. This enables the above sequence to be repeated for products P−1, P0, P1, P2 and P3.

Thus it is possible that on t=t5 an image of product P−1 with $\varphi=\varphi 0$ is obtained wherein it holds that t5−t0=S/v. Subsequently on t=t6 an image of product P0 with $\varphi=\varphi 1$ is obtained. On t=t7 an image of product P1 with $\varphi=\varphi 2$ is obtained. On t=t8 an image of product P2 with $\varphi=\varphi 3$ is obtained. On t=t9 an image of product P3 with $\varphi=\varphi 4$ is obtained. It also holds that $t_i - t_{i-1} = C/4$ for i=6, 7, 8, 9. This means that within the time period t5-t9 the products are only moved by the conveyor over a distance smaller than S. This enables the above sequence to be repeated for products P−2, P−1, P0, P1 and P2.

Thus it is possible that on t=t10 an image of product P−2 with $\varphi=\varphi 0$ is obtained wherein it holds that t10−t5=S/v. Subsequently on t=t11 an image of product P−1 with $\varphi=\varphi 1$ is obtained. On t=t12 an image of product P0 with $\varphi=\varphi 2$ is obtained. On t=t13 an image of product P1 with $\varphi=\varphi 3$ is obtained. On t=t14 an image of product P2 with $\varphi=\varphi 4$ is obtained. It also holds that $t_i - t_{i-1} = C/4$ for i=11, 12, 13, 14. Also this sequence may thus be repeated for products P−3, P−2, P−1, P0 and P1.

Thus in general it holds that the sequence of obtaining 5 pictures in the different viewing directions can be carried out for sets of products Pj, Pj−1, Pj−2, Pj−3 and Pj−4 for j=0, +/−1, +/−2, ... etc. This means that for each product Pj five images will be obtained from respective mutually different viewing directions $\varphi k$ with k=0, 1, 2, 3, 4. For each product the five images may be combined as discussed above for recognising and/or eliminating parasitic reflections. Thus in more general terms it holds that the sequence of obtaining m (m=2, 3, 4, ... ) pictures in the different viewing directions can be carried out for sets of products Pj, Pj−1, Pj−2, Pj−3, ... Pj−(m−1) for j=0, +/−1, +/−2, ... etc. This means that for each product Pj m images will be obtained from respective mutually different viewing directions $\varphi k$ with k=0, 1, 2, 3, 4 ... m−1. For each product the m images may be combined as discussed above for recognising and/or eliminating parasitic reflections.

Figure 7:
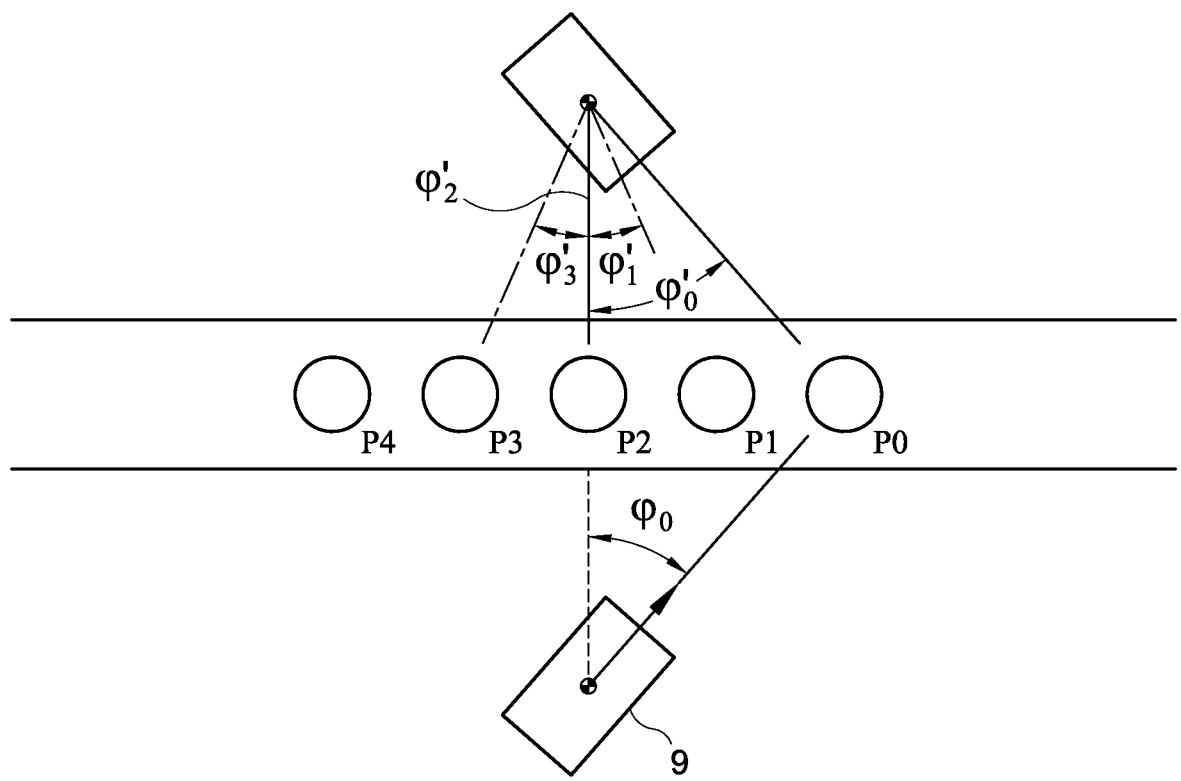
FIG. 7 shows the assembly of FIG. 6A-6E provided with a second camera.

As discussed above it is also possible to use more than one camera. As shown in FIG. 7 a second camera 9' can be added to the assembly as shown in FIGS. 6A-6E. The camera 9' can be used in exactly the same manner as described for camera 9 in FIGS. 6A-6E. The camera takes however the images from an opposite site of the conveyor. In FIG. 7 the same moment in time is shown as in FIG. 6A. Thus camera 9' will obtain an image form product P0 at t=t0 with a viewing angle $\varphi'=\varphi'0$. camera 9' will go through the same sequence as discussed for camera 9 and this obtain five images for each product for five different viewing angles $\varphi' k$ with k=0, 1, 2, 3, 4—Thus in that case by means of two camera's ten images are obtained from mutually different viewing directions. These ten images may again be combined as discussed above for identifying, ignoring and/or eliminating parasitic reflections.

As described above the first, second and further images are taken with one and the same camera. However, in other embodiments it is possible to use several cameras, each taking one or more of the different images. All these images can be relayed to the control and processing unit for eliminating parasite reflections and for analysing if the glass product contains a defect or not e.g. by known image processing techniques. As mentioned above additionally or alternatively an optical system can be used for taking the images.

As discussed above a locally increased intensity of the emitted radiation may be caused by a real defect. Also a locally decreased emitted radiation may be caused by a real defect. A real defect may be caused by a locally change in the glass distribution (e.g. a locally changed glass thickness) and/or a locally change in temperature distribution. A real defect may also be caused by a bubble in the glass product or an inclusion in the glass product. Thus a real defect may be recognised in a locally increased or decreased intensity of the infrared radiation emitted by the glass product.

Once such real defect is detected, as described above, the size and dimensions of a real defect may be automatically determined. The real defect may be compared with a reference model or the size and dimensions of the real defect may be compared with reference values to determine whether or not the product has to be rejected and/or the glass product making process should be adapted. This all may be done by means of the control and processing unit. Also the control and processing unit may cluster real defects to one large real defect etc. Based on the detected real defects as discussed above, a deviation in the glass product can be determined in a known and automatic manner.

The above system and method can however also be adapted to work with visible light. This visible light is submitted towards the product, for example projected through the product. Again a potential defect is a locally increased or locally decreased intensity of the visible light which is transmitted to the product. The sensors are now suitable for taking an image of the product while detecting real light. In addition the sensors may need not be arranged for also detecting infrared light (=infrared radiation). Again by comparing images from the product wherein the images show the product from different viewing directions relative to the product, real defects can be separated from parasitic defects as extensively discussed above.

Instead of determining whether a product is defective or not it is also possible following the same methods as discussed above to determine a deviation in the product and possibly an extend of such deviation. An additional advantage of taking multiple images under different viewing angles is that it is possible to create a substantial complete image of the glass product using only a limited number of sensors. Although in the description given above and in the claims it is stated that the sensor is sensitive to infrared radiation, the invention could also be applicable to a sensor sensitive to visible radiation.

The invention claimed is:

1. A method of producing glass products from glass product material, said method comprises the steps of:
   a. heating the glass product material;
   b. shaping the heated glass product material into a glass product;
   c. cooling the shaped glass product;
   d. inspecting the shaped glass products between the shaping the heated glass product material of step b. and the cooling the shaped glass product of step c. by means of at least one light sensitive sensor, characterised in that, said inspecting step comprises:
   e. taking a plurality of images of the glass product under a plurality of mutually different viewing directions relative to the product respectively to measure an intensity of infrared radiation emitted by the glass product without providing an infrared illumination source to the glass while taking the plurality of images;
   f. comparing the plurality of images for detecting a defect in the product and, wherein step f. includes:
      (f.1) locating within a first image of the plurality of images a position of a potential defect on the glass product wherein the position of the potential defect is identified based at least in part upon having a different intensity of infrared radiation emitted by the glass product compared to an intensity of at least another portion of the glass product, and
      (f.2) classifying a potential defect by comparing each position of a potential defect of the first image of the plurality of images to the respective same position of the potential defect in another image of the plurality of images and by performing at least one of:
      (f.2a) classifying a potential defect as a parasitic reflection, wherein a parasitic reflection is a reflection of infrared light on a surface of the glass product or is an internal reflection of infrared light in the glass product, and ignoring a potential defect or not classifying the potential defect as a real defect, if the potential defect occurs in only one of the images or in only a minority of the images on the same position of the product, and
      (f.2b) classifying a potential defect as a real defect if the potential defect occurs in at least a majority of the images on the same position of the product,
   wherein the method comprises a step of measuring light intensity by means of the at least one light sensitive sensor and by regarding an area of the product having a locally increased light intensity as a potential defect of the product.

2. The method according to claim 1 wherein step f. comprises locating in the plurality of images a position of the product which shows a potential defect in at least a minority of images of the plurality of images.

3. The method according to claim 2 wherein in step f.2a a potential defect is classified as a parasitic reflection, ignored, or not classified as a real defect if the potential defect is located on the same position of the product in at least the minority of images of the plurality of images.

4. The method according to claim 1 wherein step e. comprises:
   e1. taking a first image of the glass product under a first viewing direction relative to the product;
   e2. taking at least one second image of said glass product under a second viewing direction relative to the product wherein the first viewing direction differs from the second viewing direction; wherein step f comprises comparing said first image and the at least one second image for detecting a potential defect in the product.

5. The method according to claim 4, wherein step f. comprises f.1 determining whether or not a potential defect which is visible in the first image and located on a first position of the glass product is also visible in the at least one second image on the first position of the product.

6. The method according to claim 5, wherein in step f1. the potential defect is classified as a real defect if the potential defect which is visible in the first image and located on the first position of the glass product is also visible in the at least one second image on the first position of the product.

7. The method according to claim 4, wherein step f. comprises f3. determining whether or not a potential defect which is visible in the first image and located on the first position is also visible in the at least one second image on a second position of the product wherein the first position differs from the second position.

8. The method according to claim 7, wherein in step f2. the potential defect is ignored if the potential defect which is visible in the first image and located on the first position is also visible in the at least one second image on a second position of the product wherein the first position differs from the second position.

9. The method according to claim 7, wherein in step f2. the potential defect is classified as a parasitic reflection if the potential defect which is visible in the first image and located on the first position is also visible in the at least one second image on a second position of the product wherein the first position differs from the second position.

10. The method according to claim 4, wherein step f. comprises f3. determining whether or not a potential defect which is visible in the first image and located on a first position of the glass product is not visible in the at least one second image.

11. The method according to claim 10, wherein in step f3. the potential defect is ignored if the potential defect which is visible in the first image and located on a first position of the glass product is not visible in the at least one second image.

12. The method according to claim 10, wherein in step f3. the potential defect is classified as a parasitic reflection if the potential defect which is visible in the first image and located on a first position of the glass product is not visible in the at least one second image.

13. The method according to claim 4, wherein step e. further comprises a step e3. of taking at least one further image of the glass product under a further viewing direction relative to the product, said further viewing direction being different from the first viewing direction and being different from the second viewing direction.

14. The method according to claim 13, wherein step f. comprises a step f5. comprising determining whether or not a potential defect which is visible in the first image on a first position of the product is also visible in the second image on the first position of the product and in the at least one further image on the first position of the product and wherein, if the potential defect is visible in the second image on the first position of the product and in the at least one further image on the first position of the product, the potential defect is classified as a real defect.

15. The method according to claim 13, wherein step f. comprises a step f6 comprising determining whether or not a potential defect which is visible in the first image and located on a first position of the product is also visible in the second image on a second position of the product and in the at least one further image on a third position of the product and wherein if the first position differs from at least one of the second position and the third position classifying the potential defect as a parasitic reflection.

16. The method according to claim 13, wherein step f. comprises a step f6. comprising determining whether or not a potential defect which is visible in the first image and located on the first position of the product is not visible in at least one of the second image and the at least one further image and wherein if the potential defect is not visible in at least one of the second image and the at least one further image classifying the potential defect as a parasitic reflection.

17. The method according to claim 1, wherein in step e. the plurality of images are taken by different light sensitive sensors.

18. The method according to claim 1, wherein in step e. at least two light sensitive sensors are used, said at least light sensitive two sensors being positioned on either side of the glass product.

19. The method according to claim 1, wherein in step e. the plurality of images are taken by the same light sensitive sensor.

20. The method according to claim 1, wherein the method comprises the steps of providing an optical system, and wherein step e. comprises using said optical system in taking either one of the images of said product using the at least one light sensitive sensor.

21. The method according to claim 1, wherein the method further comprises the step of conveying the shaped glass product by means of a conveyor, and wherein the images are taken during conveyance.

22. The method according to claim 21 wherein a viewing direction of the product is defined by a viewing angle of the product relative to a direction wherein the products are conveyed.

23. The method according to claim 21, wherein the method further comprises the steps of;
placing a plurality of shaped glass products on the conveyor;
simultaneously conveying said plurality of shaped glass products by means of the conveyor;
making in step e. the plurality of images of the plurality of shaped glass products during conveying of the plurality of products at different moments in time and in mutually different viewing directions relative to a direction wherein the plurality of products are conveyed so that the plurality of images comprise in combination for each product of the plurality of products images of the product having different viewing directions relative to the product.

24. The method according to claim 23 wherein in step f. from the plurality of images a plurality of images of at least one and the same product are obtained wherein said plurality of images of the at least one product comprise the images with different viewing angles relative to the product respectively for comparing the plurality of images of the at least one product.

25. The method according to claim 23 in which the speed of the conveyor is v, the products on the conveyor are separated in the conveyor direction such that the distance between adjacent products is S wherein in a sequence for a set of m adjacent products m images are obtained within a time period which is smaller than S/v and wherein the m images have mutually different viewing angles for the m products and wherein the sequence of obtaining m (m=2, 3, 4, . . . ) pictures in the mutually different viewing directions is carried out for sets of products Pj, Pj−1, Pj−2, Pj−3, . . . Pj−(m−1) for j=0, +/−1, +/−2, +/−3, . . . , wherein it holds for each value of j that Pj and Pj−1 are adjacent products on the conveyor whereon Pj is located stream upwards relative to Pj−1.

26. The method according to claim 1 in which the plurality of images are used to create a substantial complete image of the glass product or wherein the first image and the second image and/or further images are used to create a substantial complete image of the glass product.

27. A method of producing glass products from glass product material, said method comprises the steps of:
a. heating the glass product material;
b. shaping the heated glass product material into a glass product;
c. cooling the shaped glass product;
d. inspecting the shaped glass products between the shaping the heated glass product material of step b. and the cooling the shaped glass product of step c. by means of at least one light sensitive sensor, characterised in that, said inspecting step comprises:
e. taking a plurality of images of the glass product under a plurality of mutually different viewing directions relative to the product respectively to measure an intensity of infrared radiation emitted by the glass product without providing an infrared illumination source to the glass while taking the plurality of images;
f. comparing the plurality of images for detecting a defect in the glass product and, wherein step f. includes:
(f.1) locating within a first image of the plurality of images a position of a potential defect on the glass product wherein the position of the potential defect is identified based at least in part upon having a different intensity of infrared radiation emitted by the glass product compared to an intensity of at least another portion of the glass product, and (f.2) classifying a potential defect by comparing the position of the potential defect of the first image of the plurality of images to the position of the potential defect in another image of the plurality of images and by performing at least one of:

(f.2a) classifying a potential defect as a parasitic reflection, wherein a parasitic reflection is a reflection of infrared light on a surface of the glass product or is an internal reflection of infrared light in the glass product, and ignoring a potential defect or not classifying the potential defect as a real defect if the potential defect occurs on different positions of the glass product within the at least another of the plurality of images compared to the first image of the plurality of images, wherein the method comprises a step of measuring light intensity by means of the at least one light sensitive sensor and by regarding an area of the product having a locally increased light intensity as a potential defect of the product.

28. A method of producing glass products from glass product material, said method comprises the steps of:

a. heating the glass product material;
b. shaping the heated glass product material into a glass product;
c. cooling the shaped glass product;
d. inspecting the shaped glass products between the shaping the heated glass product material of step b. and the cooling the shaped glass product of step c. by means of at least one light sensitive sensor, characterised in that, said inspecting step comprises:

e. taking a plurality of images of the glass product under a plurality of mutually different viewing directions relative to the glass product respectively to measure an intensity of infrared radiation emitted by the glass product without providing an infrared illumination source to the glass while taking the plurality of images;

f. comparing the plurality of images for detecting a defect in the product and, wherein step f. includes:

(f.1) locating within a first image of the plurality of images a position of a potential defect on the glass product wherein the position of the potential defect on the glass product is identified based at least in part upon having a different intensity of infrared radiation emitted by the glass product compared to at least another portion of the glass product, and (f.2) classifying a potential defect by comparing each position of a potential defect of the first image of the plurality of images to the respective same position of the potential defect in another image of the plurality of images, wherein the potential defect is classified as a real defect when the potential defect occurs in at least a majority of the plurality of images at a same position of the glass product, wherein the method comprises a step of measuring light intensity by means of the at least one light sensitive sensor and by regarding an area of the product having a locally increased light intensity as a potential defect of the product.

29. The method according to claim 28, wherein the potential defect is classified as a real defect when the potential defect occurs in each of the images at the same position of the product.

\* \* \* \* \*